Nov. 23, 1937.  H. SANDVOSS  2,100,037
THERMOSTAT
Filed June 5, 1935   2 Sheets-Sheet 2
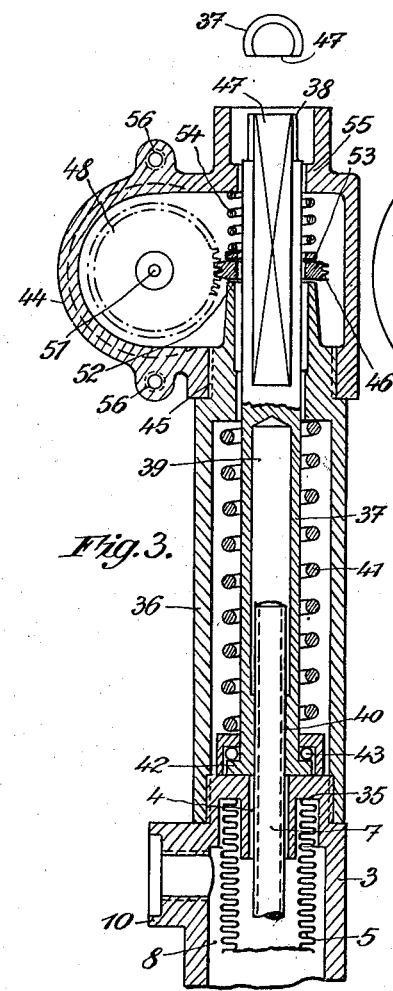
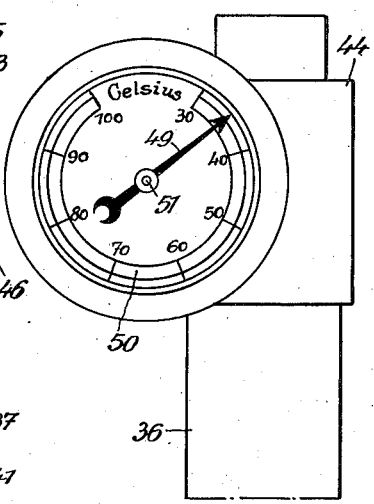
Inventor:
Hermann Sandvoss Patented Nov. 23, 1937

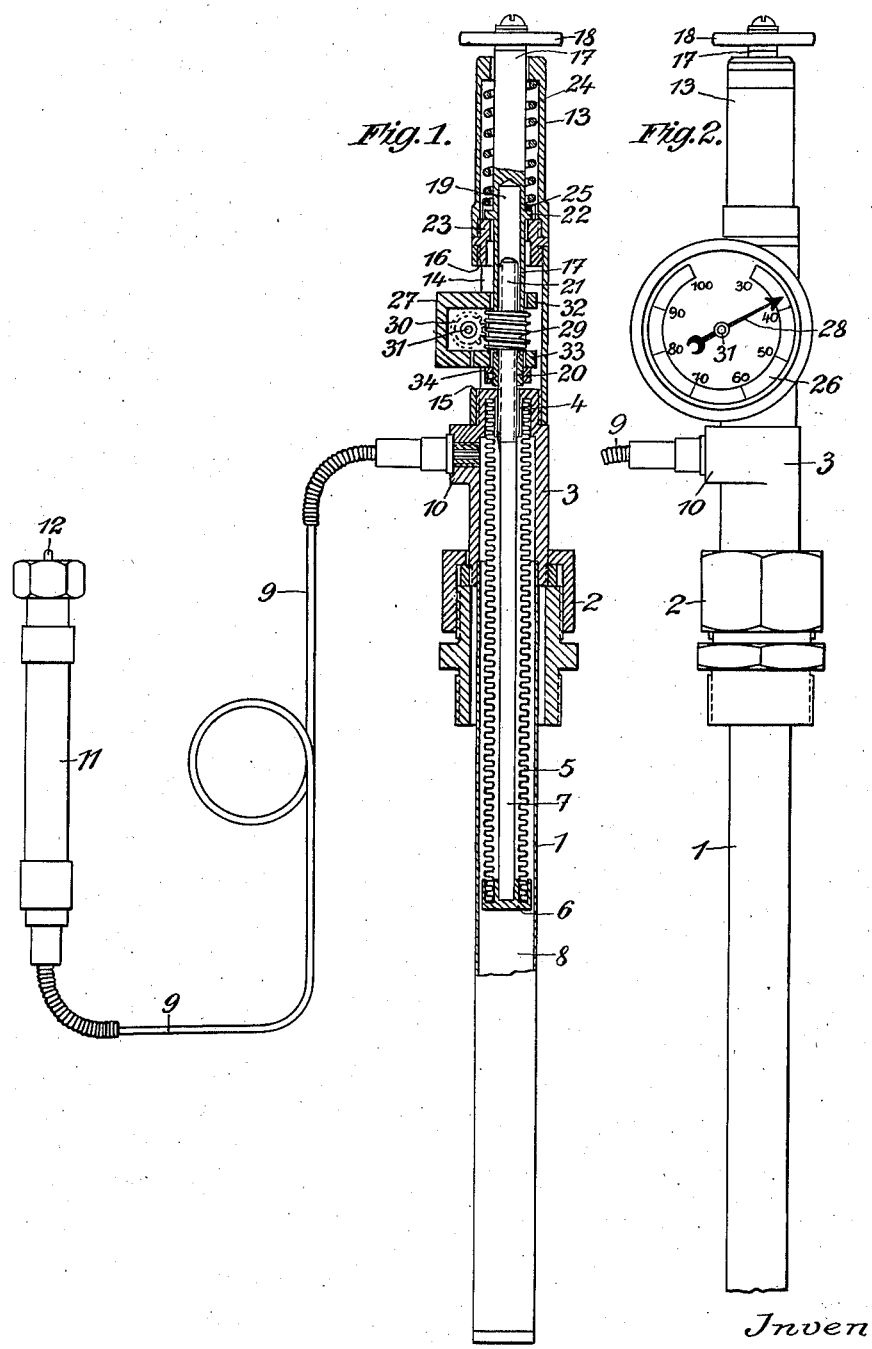

2,100,037

UNITED STATES PATENT OFFICE 2,100,037

THERMOSTAT

Hermann Sandvoss, Frankfort-on-the-Main, Germany

Application June 5, 1935, Serial No. 25,135
In Germany June 28, 1934

2 Claims. (Cl. 297—8)

This invention relates to a thermostat fitted with a spring bellows which dips into a container filled with expansion liquid and can be set at any position on a scale by means of a regulating member, excessive tension being taken up by a buffer spring.

In the known thermostats of this class the spring bellows may be set on a standard scale from a lower to a higher regulating temperature but not, conversely, from a higher to a lower temperature, as in the latter case the thermostat is still under tension and prevents deeper entry of the spring bellows into the container holding the liquid. To overcome this trouble it has been proposed to employ two separate scales, but this arrangement is bothersome and, in practical operation, causes confusion and wrong adjustments.

Compared with the prior art, the invention substantially consists in the improvement that the rotary motion influencing the position of the pointer and carried out by the rotatable regulating member supported by a buffer spring is converted into a relative motion of the pointer with respect to the scale by means operating independently of the axial displacements of the regulating member, which act counter to the buffer spring.

According to one embodiment of the invention, the scale carrier is so connected with the regulating member that while it cooperates in the axial displacements it does not join in the rotary motions thereof, the rotary motion of the regulating member causing a relative motion of the pointer with respect to the scale carrier.

Another simplified and improved constructional embodiment of the invention provides for a stationary scale carrier and for coupling a connecting member transmitting the rotary motion of the regulating member to the pointer with the regulating member in such a way that it takes part in the rotary motions but not in the axial displacements of the regulating member.

The application of the invention permits, above all, the optional adjustment of the thermostat by the regulating member from lower to higher regulating temperature, and vice versa, independently of the position and tension of the thermostat, the adjustment being always accurately indicated on one and the same scale without regard to the prevailing initial or excess tension.

Two embodiments of the invention are illustrated, by way of example, in the accompanying drawings, in which Figure 1 is a view, partly in section, of a thermostat with an operating member; Fig. 2, an elevation of the thermostat shown in Fig. 1; Fig. 3, a section of the top of another form of the invention; Fig. 4, a cross section of the regulating member with a driving surface; and Fig. 5, an elevation of the upper part of Fig. 3.

Referring to the drawings, 1 is a tubular container for receiving the expansion liquid and connected with a head 3 by means of the screw socket 2. The upper portion of the container head 3 contains the packed top end of a spring bellows 5 dipping into the container 1 and having its lower end tightly shut off by the bottom 6. A bellows rod 7 connected with the bottom 6 passes freely movable through a bore 4 of the head 3. The inner space 8 of the container 1 communicates by the capillary tube 9 linked with the container by the connection 10 with an operating body 11 whose pin 12 actuates a valve, flap or other suitable means.

In the construction shown in Figs. 1 and 2 the head 3 carries a regulating casing 13 whose lower part has a longitudinal slot 14 which is limited on top by the stop face 16 and below by the stop face 15. In the regulating casing 13, a regulating member 17 is rotatably and displaceably disposed and provided at its end projecting from the casing 13 with a hand wheel 18 or other suitable means. The lower portion of the regulating member 17 has a sleevelike cylindrical recess 19 fitted with the internal thread 20 which is in engagement with the thread 21 of the bellows rod 7, the thread 21 being accommodated in the recess 19.

The regulating member 17 has a collar 22 which rests on the stop 23 arranged inside the casing 13 and serving as abutment for the regulating member 17 which is pressed against it by means of the buffer spring 24. Between the lower end of the buffer spring 24 and the collar 22 a ball bearing 25 is preferably provided to facilitate the turning of the member 17. The buffer spring 24 is dimensioned so that it will press the collar 22 of the regulating member 17 firmly against the stop 23 and not yield during normal working of the thermostat, but that it becomes compressed in case of overpressure of the expansion liquid due to overheating of the thermostat and permits axial displacement of the bellows rod 7 and the regulating member 17 connected therewith to prevent damage to the thermostat.

The buffer spring 24 serves the further purpose of lifting the regulating member 17 if the bellows rod 7 encounters resistance during rotation of the member 17, in which case, besides the rotary motion of the member 17, an axial displacement thereof against the action of the buffer spring 24 will occur. To render the adjustment by scale and the reading independent of these axial displacements of the regulating member 17 and of the bellows rod 7 connected therewith the scale is disposed on a separate movable carrier which is so connected with the regulating member 17 that it joins in the axial displacements of the latter but not in the rotary motions thereof which, however, are utilized to effect relative motion of an indicating member with respect to the scale.

Rotation of the scale carrier is preferably prevented by slidingly guiding it, say, in the slot 14 of the regulating casing 13. For bringing about a deflection of the pointer relative to the scale it would suffice, for instance, to screw the carrier, constructed as described, like a nut to the regulating member 17 and to secure to the latter a mark for indicating on a scale arranged on the carrier and extending parallel to the axis of the regulating member 17 the axial displacement of the carrier caused by rotation of the member 17.

In the construction shown, according to the invention, a circular scale 26 is employed which is secured to a caselike carrier 27 and over which moves a pointer 28 rotatably disposed in the carrier 27. The carrier 27 is guided in the slot 14 and arranged on the regulating member 17 so as to be loosely held in radial direction but axially kept between stops. Rotary motion of the regulating member 17 is transmitted to the pointer 28 by a gear which preferably comprises a worm 29 non-rotatably secured to the member 17 and cooperating with a toothed wheel 30 rotatably disposed on the scale carrier 27. The pointer 28 may be directly attached to the toothed wheel shaft 31 or by means of an interposed gearing. The worm 29 may serve also as driver for the scale carrier 27 by being positioned between the stoplike jaws 32, 33 thereof. Below the jaw 33 a special stop ring 34 is secured to the regulating member 17. The pointer 28 can be adjusted relative to its axis by a knob to permit proper setting according to prevailing conditions at the point of installation of the thermostat.

The mode of operation of the thermostat according to Figs. 1 and 2 is as follows:

Assumed that the thermostat opens or closes a regulating valve according to the temperature at the container 1 by means of the pin 12 extending from the operating body 11. The temperature at which the thermostat actuates the pin 12 can be adjusted by the regulating member 17. For example, to adjust the thermostat from a lower to a higher control temperature, the member 17 is turned by the hand wheel 18 in a certain direction so as to screw the bellows rod 7 into the recess 19 of the member 17. This causes a shortening of the spring bellows 5 and an enlargement of the space 8 for the expansion liquid. The operating body 11 withdraws therefore its pin 12, and the regulating valve is for instance opened. The temperature at the container 1 must then rise again to the newly adjusted control temperature while the expansion liquid in the space 8 expands correspondingly. When the newly adjusted control temperature is exceeded, the expansion liquid, which now completely fills the space 8 again, exerts pressure through the capillary tube 9 upon the operating body 11 and effects for instance the closing of the regulating valve. If the temperature drops below the adjusted limit, the valve is opened again.

The worm 29 cooperates in the rotation of the regulating member 17 and drives the toothed wheel 30 with the pointer 28 which indicates the adjusted higher control temperature on the circular scale 26 while the scale carrier 27 remains inoperative.

If, on the other hand, the thermostat is to be adjusted from a higher to a lower control temperature, the regulating member 17 is turned in opposite direction, whereby the bellows rod 7 is unscrewed and the spring bellows 5 extended. If the regulating valve is opened, the pin 12 of the operating body 11 is pressed into its extreme end position and the valve closed. For the time being, the bellows rod 7 cannot be screwed back any farther, because the expansion liquid fills the entire space 8 and prevents expansion of the spring bellows 5. However, during further rotation of the regulating member 17 the latter, against the action of the buffer spring 24, can be axially displaced upwardly, whereby the buffer spring 24 is compressed, and the scale carrier 27 moving in the slot 14 as well as the members 28, 29, 30, 31 also join in this displacement motion. The indication of the adjustment brought about by the rotation of the regulating member 17 is therefore not affected by this displacement, the indicating device continuing to operate as in inoperative position and adjusting the pointer 28 on the scale 26. It is therefore possible to adjust the thermostat to the new lower control temperature by means of the scale without further ado.

When the temperature at the container 1 drops, owing to the continual closing of the regulating valve, the expansion liquid contracts and permits the buffer spring 24 to depress the regulating member 17 with the bellows rod 7 and the spring bellows 5 until the space 8 has attained the size corresponding to the new regulating temperature. At that moment, the collar 22 of the member 17 is seated on the stop face 23, and the thermostat continues to operate at the new control temperature. The scale carrier 27 again cooperates in this displacement of the regulating member 17 without causing thereby any change in the position of the pointer 28 relative to the scale 26.

Even if the buffer spring 24 acts during overheating of the thermostat and permits yielding of the regulating member 17 with the rod 7, the scale carrier 27 together with its indicating members will be raised and lowered without affecting thereby the position of the pointer, so that the adjustment of the thermostat is always correctly indicated. As explained, the position of the pointer 28 will be varied only during rotation of the regulating member 17.

The construction shown in Figs. 3 to 5 is of a still simpler and more compact type. In the drawing, the lower portion of the thermostat is not shown, since it corresponds to the one shown in Fig. 1. The container head 3 into which at 35 the spring bellows 5 is packed carries the attached or screwed on casing 36 containing a rotatable and axially displaceable regulating member 37 whose top end has a stepped and trimmed head 38 to facilitate the application of a socket wrench. The cylindrical recess 39 of the regulating member 37 is provided with internal thread 40 into which the bellows rod 5 is screwed which is threaded also.

The buffer spring 41 which could be arranged in a manner similar to the one shown in Fig. 1 is preferably fixed in the lower part of the casing 36 between the indicating device and the lower end of the member 37, which is fitted with a collar 42 and interposed ball bearing 43.

According to Fig. 3, the preferably caselike scale carrier 44 is stationarily arranged by being connected for instance with the casing 36 by a bolt 45, and a special connecting member transmitting the rotary motion of the regulating member 37 to a pointer is coupled with the member 37 so as to cooperate in the rotary motions but not in the axial displacements or buffer motions thereof. An arrangement of this kind can be carried out in various ways, for instance by means of a stationary toothed wheel and a channellike longitudinal toothing on the regulating member. The connecting member comprises preferably a worm 46 slideably disposed on a driving face 47 of the regulating member 37 and cooperating with a toothed wheel 48 arranged on the stationary scale carrier 44. The toothed wheel 48 may be directly coupled with a pointer 49 moving over a preferably circular scale 50, the toothed wheel 48 and the pointer 49 being both disposed on the shaft 51.

The driving face 47 is simply formed by one-sided sloping of the round cross section of the regulating member 37, and the inner wall of the perforated worm 46 has a stop face corresponding with the sloping 47.

The worm 46 is held in position by resting on the bearing surface 52 of the regulating casing 36 and, by means of an interposed disc 53, being held by a spring 54 which with its other end is supported by the head 55 of the scale carrier 44 surrounding the parts mentioned. By means of the screw joints 56 the scale 50 can be secured to the carrier 44 so as to be turnable and selectively pointing in all directions. In this way, the scale 50 can be always adjusted to keep the numbers on the scale upright and thus facilitate reading. The pointer 49 can be adjusted on its shaft 51 by means of a knob, and it is further possible to rotatably dispose the scale casing 44 on the regulating casing 36.

The thermostat according to Fig. 3 to 5 functions substantially like the one shown in Figs. 1 and 2. During rotation of the regulating member 37 in one or the other direction the bellows rod 7 engages more or less the internal thread 40, whereby the spring bellows 5 is shortened or extended. The worm 46 cooperates in the rotation of the regulating member 37 and, by means of the toothed wheel 48, adjusts the pointer 49 so that the amount of rotation can be read on the scale 50.

When during adjustment from a higher to a lower control temperature the regulating member 37 is axially displaced against the action of the buffer spring 41, owing to the complete occupation of the container 1 by the expansion liquid, the upper portion of the member 37, which has a driving face 47 of sufficient length, slides upwardly in the worm 46 while the latter as well as the other members forming the indicating device do not join in this displacement. The rotation of the regulating member 37 is, however, transmitted to the pointer 49 in the manner explained irrespective of this displacement. When after cooling and contraction of the expansion liquid the regulating member 37 is pressed down by the buffer spring 41 until the collar 42 rests on the head 3, the member 37 with its face 47 slides down in the worm 46 without causing a variation in the scale indication, which is effected only by a rotation of the member 37.

The regulating member 37 can in similar manner rise and fall without influencing the position of the pointer 49, if it yields against the action of the buffer spring 41 during overheating of the thermostat.

I claim:—

1. A thermostat comprising a casing, a container for an expanding liquid connected to the casing, a spring bellows in the container, a bellows rod in the spring bellows, a regulating member mounted in the casing for rotation and axial displacement, a stop in the casing, a spring operatively connected to the regulating member for holding the regulating member against the stop, means for rotating the regulating member, a female thread on the regulating member, a male thread on the bellows rod engaging in the female thread of the regulating member, a carrier secured to the casing, a scale on the carrier, a pointer rotatably mounted on the carrier for cooperation with the scale, mechanism on the carrier for rotating the pointer, a worm gear forming part of the mechanism, a worm meshing with the worm gear and mounted on the regulating member for relative axial displacement with respect to, and for positive tangential engagement with, the regulating member, and checks on the casing arranged to engage opposite sides of the worm for holding it in position with respect to the worm gear.

2. A thermostat comprising a casing, a container for an expanding liquid connected to the casing, a spring bellows in the container, a bellows rod in the spring bellows, a regulating member mounted in the casing for rotation and axial displacement, a stop in the casing, a spring operatively connected to the regulating member for holding the regulating member against the stop, means for rotating the regulating member, a female thread on the regulating member, a male thread on the bellows rod engaging in the female thread of the regulating member, a carrier secured to the casing, a scale on the carrier, a pointer rotatably mounted on the carrier for cooperation with the scale, mechanism on the carrier for rotating the pointer, a worm gear forming part of the mechanism, a worm meshing with the worm gear and mounted on the regulating member for relative axial displacement with respect to, and for positive tangential engagement with, the regulating member, a fixed and a movable check arranged on the casing to engage opposite sides of the worm, and a spring operatively connected to the movable check, for holding the worm in position with respect to the worm gear.

HERMANN SANDVOSS.